United States Patent
Kikuiri et al.

(10) Patent No.: US 6,507,455 B1
(45) Date of Patent: Jan. 14, 2003

(54) THIN FILM MAGNETIC HEAD CAPABLE OF REDUCING COIL RESISTANCE VALUE OF ENTIRE COIL LAYER FORMED BETWEEN CORE LAYERS

(75) Inventors: Katsuya Kikuiri, Niigata-ken (JP); Takashi Saito, Niigata-ken (JP)

(73) Assignee: Alps Electric Co., Ltd., Tokyo (JP)

(*) Notice: Subject to any disclaimer, the term of this patent is extended or adjusted under 35 U.S.C. 154(b) by 0 days.

(21) Appl. No.: 09/525,958

(22) Filed: Mar. 15, 2000

(30) Foreign Application Priority Data

Mar. 18, 1999 (JP) .......................................... 11-073713

(51) Int. Cl.⁷ ................................................. G11B 5/17
(52) U.S. Cl. ...................................................... 360/123
(58) Field of Search ......................................... 360/123

(56) References Cited

U.S. PATENT DOCUMENTS

| 5,059,278 A | 10/1991 | Cohen et al. ............... 29/603.3 |
| 5,124,870 A | 6/1992 | Toyoda ........................ 360/126 |
| RE35,228 E * | 5/1996 | Mowry et al. ............... 360/126 |

FOREIGN PATENT DOCUMENTS

| JP | 5-36028 | * 2/1993 |
| JP | 7-57217 | 3/1995 |

* cited by examiner

*Primary Examiner*—David Davis
(74) *Attorney, Agent, or Firm*—Brinks Hofer Gilson & Lione (57) ABSTRACT

A thin film magnetic head that reduces the coil resistance of the coil layer formed between core layers is formed by increasing the conductor width at a fixed ratio from the inner to the outer side of the coil layer in the conductor width of each turn. The conductor width on the front side with respect to a base end portion of an upper core layer is smaller than the conductor width on the rear side with respect to the base end portion, whereby it is possible to reduce the coil resistance value of the entire coil layer. Further, using a change in conductor width, it is possible to increase the magnetic efficiency of the magnetic head compared to conventional magnetic heads.

16 Claims, 4 Drawing Sheets

THIN FILM MAGNETIC HEAD CAPABLE OF REDUCING COIL RESISTANCE VALUE OF ENTIRE COIL LAYER FORMED BETWEEN CORE LAYERS

BACKGROUND OF THE INVENTION

1. Field of the Invention

The present invention relates to a thin film magnetic head in which a coil layer is formed between core layers and, in particular, to a thin film magnetic head capable of achieving a reduction in coil resistance value without involving a deterioration in magnetic efficiency.

2. Description of the Related Art

An inductive head for recording a recording signal on a recording medium provided, for example, in a hard disk apparatus, comprises lower and upper core layers of a magnetic material and a coil layer formed between the core layers.

A base portion of the upper core layer is magnetically connected to the lower core layer. In the plane (ABS plane) opposed to the recording medium, a magnetic gap is formed between the lower and upper core layers.

The coil layer is wound around the base portion of the upper core layer, and the conductor width of the coil layer in each turn is substantially the same. When a recording current is supplied to the coil layer, a recording magnetic field is induced in both core layers, and due to a leakage magnetic field from the magnetic gap portion, a magnetic signal is recorded on a recording medium such as a hard disk.

However, the coil length of the coil layer in each turn is longer on the outer side than on the inner side, so that when the conductor width in each turn is substantially the same as in the conventional art, the coil resistance value rapidly increases in a turn on the outer side, and the coil resistance value of the entire coil layer increases, making it impossible to effectively cope with the recent tendency to record in high density.

Figure 1:
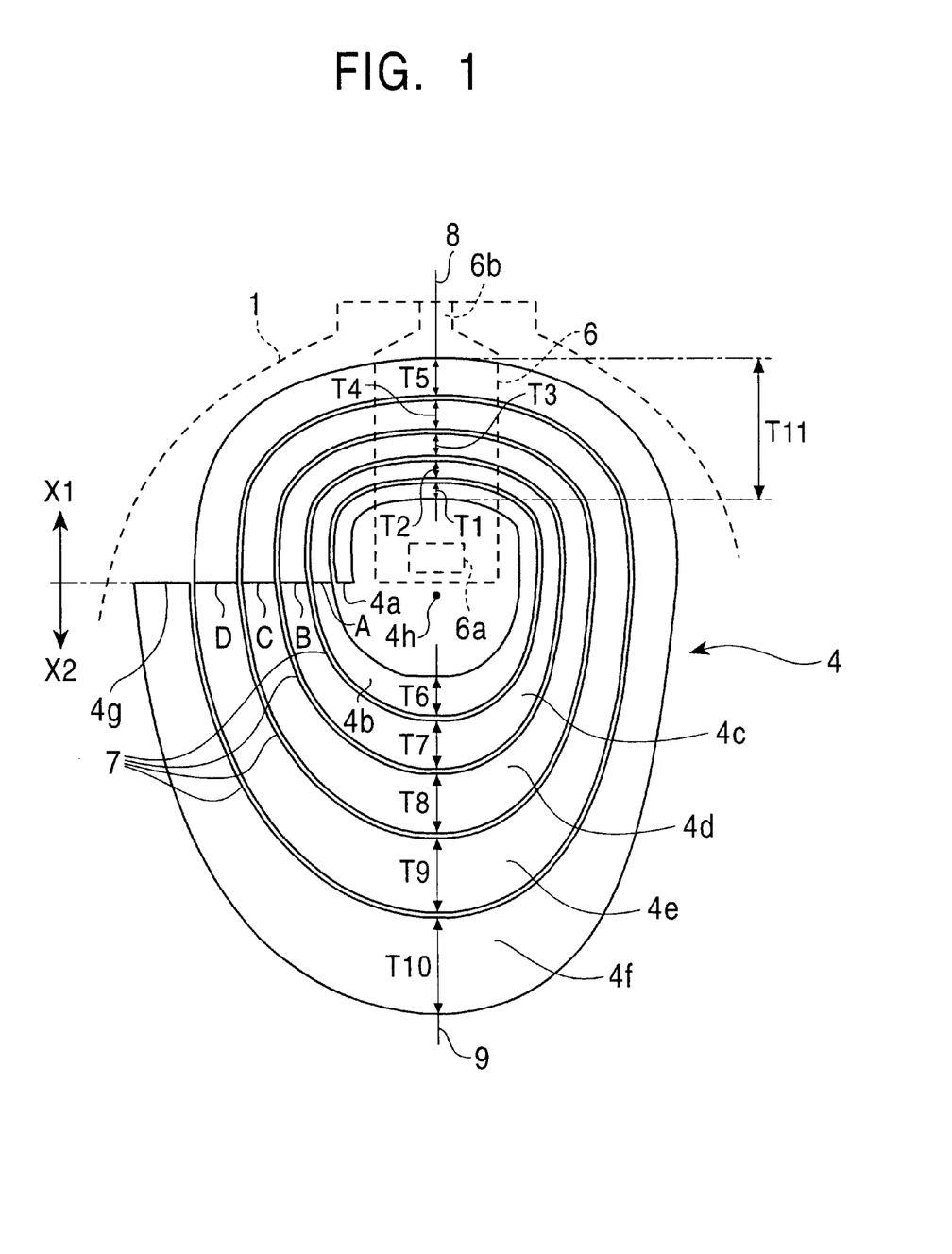
FIG. 1 is a partial plan view showing the construction of a thin film magnetic head according to an embodiment of the present invention.

To solve the above problem, Japanese Patent Laid-Open No. 7-57217 discloses an example in which, as shown in FIG. 1, the conductor width of the coil layer formed on the rear side with respect to the base portion of the upper core layer (on the opposite side with respect to the side opposed to the recording medium) is formed so as to become gradually larger from the inner side to the outer side of the coil layer. According to this publication, by making the conductor width on the rear side with respect to the base portion of the upper core layer gradually larger, it is possible to restrain the coil resistance value of the turn on the outer periphery where the coil length is large, making it possible to reduce the coil resistance value of the entire coil layer.

Further, according to this publication, it is desirable as in the prior art to make the conductor width of each turn on the front side with respect to the base portion of the upper core layer (the side opposed to the recording medium) the same dimension. This is for the reason that the coil layer formed on the front side with respect to the base portion must be formed between the base portion of the upper core layer and the forward end portion. If the conductor width of each turn on the front side with respect to the base end portion is larger than in the prior art, it is necessary to make the length between the base end portion and the forward end portion of the upper core layer large, so that the magnetic path length formed from the lower core layer to the upper core layer becomes rather large, resulting in a deterioration in magnetic efficiency.

However, if the conductor width of each turn formed on the front side with respect to the base end portion of the upper core layer is of the same dimension as in the prior art, the coil resistance value of each turn on the front side with respect to the base end portion rapidly increases from the inner to the outer side, so that there is a fear that the coil resistance value of the entire coil layer cannot be effectively reduced.

Further, at page 3, column 0014, lines 4 through 6 of this publication, there is a description to the effect that "it is possible to adopt a configuration such that the line width, including the front side, gradually increases from the inner to the outer side". However, if the conductor width of the coil layer on the front side with respect to the base end portion of the upper core layer is made gradually larger from the inner to the outer side without any restriction, the conductor width of the entire coil layer on the front side with respect to the base end portion increases, so that it is necessary to increase the length between the base end portion and the forward end portion of the upper core layer, with the result that the magnetic path length increases, which leads to a deterioration in magnetic efficiency.

SUMMARY OF THE INVENTION

The present invention has been made with a view toward solving the above problems. Accordingly, it is an object of the present invention to provide a thin film magnetic head capable of correcting the configuration of the coil layer and effectively reducing the coil resistance value without involving a deterioration in magnetic efficiency.

In accordance with the present invention, there is provided a thin film magnetic head comprising a lower core layer formed of a magnetic material, an upper core layer of a magnetic material forming a magnetic gap between it and the lower core layer at a portion opposed to a recording medium, and a coil layer which is formed in a pattern so as to be wound around the periphery of a base end portion of the upper core layer and which induces a recording magnetic field in the lower core layer and the upper core layer, wherein the conductor width of the coil layer when a first normal extending from the center of the coil layer toward the outer periphery of the coil layer is measured increases from the inner to the outer side in at a fixed ratio, and wherein the conductor width of the coil layer in each turn is such that the conductor width on the first normal extending from the center of the coil layer to the side opposed to the recording medium is smaller than the conductor width on a second normal extending from said center in a direction opposite to the first normal.

As described above, in the present invention, the conductor width of the coil layer when the normal extending from the center of the coil layer toward the outer periphery of the coil layer increases at a fixed ratio from the inner to the outer side. In particular, in the present invention, the conductor width of the coil layer formed on the side opposed to the recording medium with respect to the base end portion of the upper core layer also increases at a fixed ratio from the inner to the outer side, so that the coil resistance value of the coil layer formed on the side opposed to the recording medium with respect to the base end portion is not extremely large. Due to the above arrangement, in the present invention, it is possible to restrain an increase in the coil resistance value in each turn from the inner to the outer side or reduce it, and it is possible to reduce the resistance value of the entire coil layer as compared with the prior art. Further, by increasing the conductor width at a fixed ratio, it is possible to set the increase or decrease in the coil resistance value in each turn from the inner to the outer side to a substantially fixed value, so that it is possible to set the coil resistance value of the entire coil layer within a fixed range beforehand, making it possible to form the coil layer in a pattern.

Furthermore, in the present invention, the conductor width on the first normal extending from the center of the coil layer to the side opposed to the recording medium is smaller than the conductor width on the second normal extending from said center in a direction opposite to the first normal, whereby there is substantially no need to make the length between the base end portion and the forward end portion of the upper core layer larger than in the prior art. Thus, in the present invention, the length of the magnetic path formed between the upper core layer and the lower core layer is not large, and it is possible to make the magnetic efficiency approximately the same as in the prior art or increase it as compared to prior art.

Further, in the present invention, the coil layer is wound in not less than 5 turns, and assuming that the coil resistance value of the one turn positioned on the outermost side of the coil layer is DCRout, and that the coil resistance value of the one turn positioned nearest to the center of the coil layer is DCRin, the percentage of DCRout/DCRin is approximately not less than 45% and not more than 230%.

As described above, in the present invention, the conductor width increases at a fixed ratio from the inner to the outer side of the coil layer. In addition to that, the coil layer is formed in a pattern such that the coil resistance value of the coil layer in the innermost turn and that in the outermost turn are in the above range, whereby it is possible to reduce the coil resistance value of the entire coil layer as compared with the prior art, in which the conductor width of the coil layer is substantially the same in the inner and the outer side.

Further, in the present invention, it is desirable that the coil resistance value of one turn is substantially the same value in each turn. In this way, by forming the coil layer in a pattern such that the coil resistance value of each turn is substantially the same, it is possible to reduce the resistance value of the entire coil layer more effectively, as clarified by the results of an experiment described below.

Further, in the present invention, it is desirable that the conductor width of the coil layer in each turn be constant in a predetermined range including the first normal, whereby it is possible to make magnetic path length substantially the same as in the prior art or shorter than in the prior art, making it also possible to make the magnetic efficiency substantially the same as in the prior art or increase it as compared with the prior art.

Further, in the present invention, it is desirable that the conductor width of the coil layer in each turn be constant in a predetermined range including the second normal, the conductor width of the coil layer in each turn be the largest on the second normal and gradually decrease toward both sides, whereby it is possible to reduce the coil resistance value of the entire coil layer.

Further, in the present invention, it is more desirable that the conductor width increase ratio be set such that the coil resistance value of each turn is substantially the same from the inner to the outer side of the coil layer. When the coil resistance value of each turn is substantially the same value, it is possible to reduce the coil resistance value of the entire coil layer most effectively.

DESCRIPTION OF THE PREFERRED EMBODIMENTS

Figure 2:
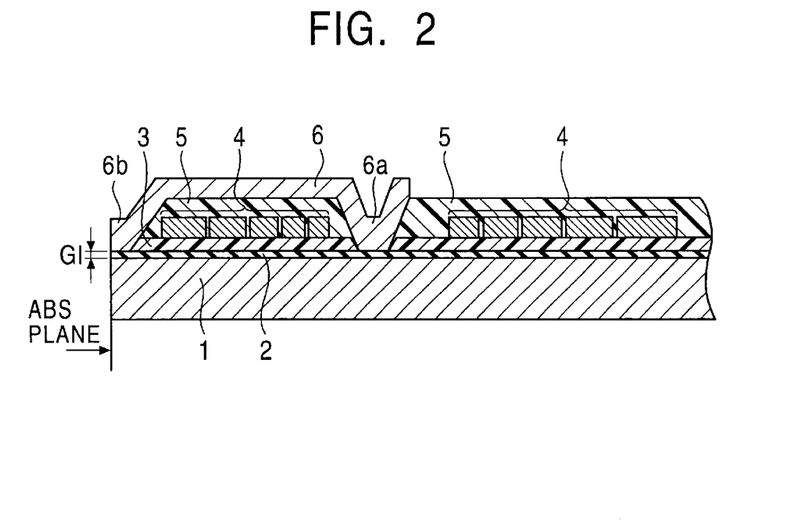
FIG. 2 is a longitudinal sectional view of the thin film magnetic head shown in FIG. 1.

FIG. 1 is a partial plan view of a thin film magnetic head according to the present invention mounted, for example, on a hard disk apparatus, and FIG. 2 is a longitudinal sectional view of the thin film magnetic head shown in FIG. 1.

The thin film magnetic head shown in FIGS. 1 and 2 is an inductive head for recording, or a so-called composite type thin film magnetic head consisting of the above inductive head with a playback head (MR head) utilizing a magnetic resistance effect which is stacked on the lower side as seen in the drawing.

In FIG. 2, numeral 1 indicates a lower core layer formed of a magnetic material such as permalloy (NiFe type alloy), and on the lower core layer 1 there is formed a gap layer 2 of a non-magnetic material such as alumina ($Al_2O_3$) or $SiO_2$.

On the gap layer 2, there is formed an insulating layer 3 consisting of polyimide or a resist material. On this insulating layer 3, there is formed a coil layer 4 in a pattern such that it is wound around a base end portion 6a of an upper core layer 6 described below.

Further, as shown in FIG. 2, the above-mentioned coil layer 4 is covered with an insulating layer 5 formed of polyimide or a resist material, the upper core layer 6, consisting of a magnetic material, is formed on the insulating layer 5.

As shown in FIG. 2, the base end portion 6a of the upper core layer 6 is magnetically connected to the lower core layer 1 through the insulating layers 3 and 5 and a hole formed in the gap layer 2. At the plane (ABS plane) where it is opposed to the recording medium, a forward end portion 6b of the upper core layer 6 is opposed to the lower core layer 1 through the intermediation of the gap layer 2, forming a magnetic gap G1 providing a recording magnetic field for a recording medium such as a hard disk.

The coil layer 4 shown in FIG. 1 is formed of a conductive material with low electrical resistance such as copper (Cu), and the winding center 4a of the coil layer 4 is formed near the portion where the base end portion 6a of the upper core layer 6 is to be formed, forming a pattern such that starting from the winding center 4a, the coil layer is wound around the base end portion 6a of the upper core layer 6.

In the embodiment shown in FIG. 1, the number of turns of the coil layer 4 is 5, and, for example, the portion from the winding center 4a to a division line A is referred to as a first turn 4b; the portion from the division line A to a division line B is referred to as a second turn 4c; the portion from the division line B to a division line C is referred to as a third turn 4d; the portion from the division line C to a division line D is referred to as a fourth turn 4e; and the portion from the division line D to a winding end portion 4g is referred to as a fifth turn 4f.

In the present invention, the conductor width of the coil layer 4 when a normal extending from the center 4h of the coil layer 4 to the outer periphery of the coil layer 4 is measured increases at a fixed ratio from the inner to the outer side, and the conductor width of the coil layer 4 in each turn is such that the conductor width on a first normal 8 extending from the center 4h of the coil layer 4 to the side opposed to the recording medium (front side; direction X1 in the drawing) is smaller than the conductor width on a second normal 9 extending from the center 4h in a direction opposite to the first normal 8 (rear side; direction X2 in the drawing).

That is, in the present invention, irrespective of whether it is formed on the front side or the rear side with respect to the base end portion 6a of the upper core layer 6, the conductor width of the coil layer 4 when the normal extending from the center 4h of the coil layer 4 to the outer periphery of the coil layer 4 increases at a fixed ratio from the innermost first turn 4b where the coil is shortest to the outermost fifth turn 4f, and, in addition to that, the conductor width in each turn is smaller on the front side than on the rear side with respect to the base end portion 6a of the upper core layer 6.

In this way, the conductor width in each turn is smaller on the front side than on the rear side with respect to the base end portion 6a of the upper core layer 6 because the conductor width on the front side influences the length of the magnetic path formed from the lower core layer 1 (See FIG. 2) to the upper core layer 6.

That is, when the conductor width in each turn formed on the front side with respect to the base end portion 6a of the upper core layer 6 is too large, the width dimension T11 of the coil layer 4 on the front side with respect to the base end portion 6a is too large, and the length between the forward end portion 6b and the base end portion 6a of the upper core layer 6 must be large, so that the magnetic path length is much larger, resulting in a deterioration in magnetic efficiency.

In particular, in the present invention, the conductor width in each turn on the first normal 8 extending forwardly (in the direction X1) from the center 4h of the coil layer 4 increases at a fixed ratio from the inner to the outer side, so that the conductor width in each turn on the front side with respect to the center 4h of the coil layer 4 is appropriately adjusted such that the width dimension T11 of the coil layer 4 on the front side with respect to the base end portion 6a is approximately the same as or smaller than that of the conventional coil layer.

In contrast, in the coil layer 4 formed on the rear side (in the direction X2 in the drawing) with respect to the base end portion 6a of the upper core layer 6, there is no restriction in magnetic path length as mentioned above, so that the conductor width can be set relatively freely. Thus, as shown in FIG. 1, it is possible to make large the conductor width in each turn on the second normal 9 extending rearwards from the center 4h of the coil layer 4.

As described above, in the present invention, the conductor width of the coil layer 4 when the normal extending from the center 4h of the coil layer 4 toward the outer periphery of the coil layer 4 is measured increases at a fixed ratio from the innermost first turn 4b where the coil length is small to the outermost fifth turn 4f. Since resistance is proportional to length and inversely proportional to sectional area, by making the conductor width relatively large in the outer turn where the coil length is large, it is possible to restrain an increase in the coil resistance value in each turn from the inner to the outer side or reduce the value.

In particular, in the present invention, the conductor width of the coil layer 4 formed on the front side with respect to the base end portion 6a of the upper core layer 6 also increases at a fixed ratio from the inner to the outer side, so that the coil resistance value in each turn on the front side with respect to the base end portion 6a does not increase so much from the inner to the outer side, or it can be reduced, so that it is possible to restrain an increase in the coil resistance value in each turn effectively or reduce the value.

In this way, in the present invention, it is possible to restrain an increase in the coil resistance value in each turn from the inner to the outer side of the coil layer 4 or reduce the value, so that it is possible to reduce, as compared with the prior art, the coil resistance value of the entire coil layer, which can be obtained from the sum total of the coil resistance values of the turns.

Further, by increasing the conductor width at a fixed ratio, it is possible to set the increase or decrease in the coil resistance value in each turn from the inner to the outer side to a substantially fixed value, so that it is possible to set the coil resistance value of the coil layer 4, which can be obtained from the sum total of the coil resistance values of the turns, to a fixed range beforehand to form the coil layer 4. Further, since the conductor width increases at a fixed ratio from the inner to the outer side, it is relatively easy to design the pattern configuration of the coil layer 4.

Further, in the conductor width of each turn, the conductor width on the first normal 8 extending from the center 4h of the coil layer 4 to the side opposed to the recording medium (front side; in the direction X1 in the drawing), is smaller than the conductor width on the second normal 9 extending from the center 4h in a direction opposite to the first normal 8 (rear side; in the direction X2 in the drawing), whereby the length between the base end portion 6a and the forward end portion 6b of the upper core layer 6 is not substantially larger than that in the prior art. Thus, in the present invention, the length of the magnetic path formed from the upper core layer 6 to the lower core layer 1 is not large, and it is possible to make the magnetic efficiency approximately the same as or higher than that in the prior art.

Further, in the present invention, when the coil layer 4 is formed in 5 turns or more, it is desirable to set the ratio in the increase in the conductor width from the inner to the outer side of the coil layer 4 such that the percentage of the value obtained by dividing the coil resistance value DCRout in the outermost turn (the fifth turn 4f in FIG. 1) by the coil resistance value DCRin in the innermost, first turn coil layer 4b, DCRout/DCRin, is approximately not less than 45% and not more than 230%.

In this range, it is possible to effectively reduce the coil resistance value of the entire coil layer 4 as compared with the prior art, in which the conductor width of the coil layer in each turn is the same.

Further, in the present invention, it is more desirable to set the increase ratio in conductor width from the inner to the outer side of the coil layer 4 such that the coil resistance value of one turn is of substantially the same value in each turn. That is, it is more desirable that the coil resistance value DCRout in the outermost turn (the fifth turn 4f in FIG. 1) be substantially the same as the coil resistance value DCRin in the first, innermost turn 4b, the percentage of DCRout/DCRin being approximately 100%.

As is known from the experiment described below, when the coil resistance value in each turn is set to be substantially the same value, it is possible to most effectively reduce the coil resistance value of the entire coil layer 4.

Further, as shown in FIG. 1, in the present invention, it is desirable that the conductor width of the coil layer 4 in each turn be constant in a predetermined range including the first normal 8. Here, the predetermined range is, for example, on the front side with respect to the base end portion 6a. As shown in FIG. 1, it can be seen that the conductor width of the first turn 4b is formed in a fixed width dimension T1 on the front side with respect to the base end portion 6a of the upper core layer 6. Similarly, it is desirable that the conductor width in the second turn 4c to the fifth turn 4f be formed in a fixed width dimension T2 to T5 on the front side with respect to the base end portion 6a of the upper core layer 6.

Alternatively, the predetermined range is a range at least overlapping the upper core layer 6, in the range where it overlaps the upper core layer 6 as shown in FIG. 1, it can be seen that the conductor width in each turn is formed in a fixed width dimension of T1 to T5.

In this way, by making the conductor width on the front side with respect to the base end portion 6a, or the conductor width in the range overlapping the upper core layer 6, in a fixed width dimension in each turn, it is possible to facilitate the formation of the width dimension T11 of the coil layer 4 on the front side with respect to the base end portion 6a, and there is no need to increase the length between the base end portion 6a and the forward end portion 6b of the upper core layer 6, making it possible to make the magnetic efficiency approximately the same or better than in the prior art.

Further, in the present invention, it is desirable that in the predetermined range including the second normal 9, the conductor width of the coil layer 4 in each turn be maximum on the second normal 9 and gradually reduced toward both ends. In other words, as shown in FIG. 1, the conductor width in each turn gradually increases rearwards from the base end portion 6a of the upper core layer 6, the conductor width T6 to T10 in each turn being maximum on the rear end side of the base end portion 6a (on the second normal 9).

As described above, on the rear side with respect to the base end portion 6a of the upper core layer 6, the coil layer can be formed in a relatively free configuration, so that, in particular, to reduce the coil resistance value in each turn to thereby reduce the coil resistance value of the entire coil layer 4, it is desirable to gradually increase the conductor width in each turn on the rear side with respect to the base end portion 6a to achieve an increase in sectional area, thereby reducing the coil resistance value, which is inversely proportional to sectional area.

While in the embodiment shown in FIG. 1 a coil layer 4 in which the number of turns is 5 is shown, the present invention is applicable to cases in which the number of turns may be more than 5 or less than 5.

Further, while in the present invention the space 7 between turns of the coil layer 4 is not mentioned, it is desirable that this space 7 be formed in a fixed width dimension between turns, a smaller width dimension being more desirable for the space 7. The width dimension of this space 7 also influences the coil length in each turn, and further, the coil resistance value of the entire coil layer 4, so that it should be formed in an appropriate range.

In the present invention, as in the coil layer 4 shown in FIG. 1, there was formed a coil layer whose conductor width when the normal extending from the center 4h of the coil layer 4 toward the outer periphery of the coil layer 4 is measured increases at a fixed ratio, and an experiment was performed on the relationship between DCRout/DCRin obtained by dividing the coil resistance value DCRout of the turn positioned outermost of the coil layer by the coil resistance value DCRin of the first turn positioned innermost and the coil resistance value of the entire coil layer.

In the experiment, the number of turns was 5, and 8 coils whose conductor width increase ratio are different were formed, the coil resistance value of each coil layer in each turn being measured. The results of the experiment are shown in FIG. 3.

Figure 3:
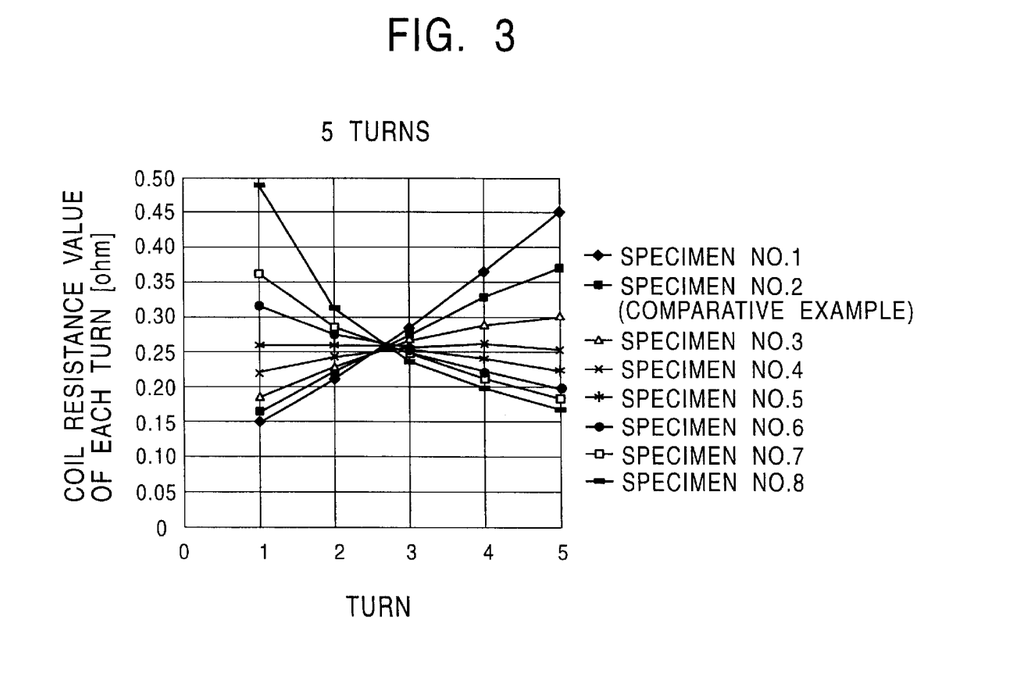
FIG. 3 is a graph of the coil resistance value of each turn of eight specimens when the number of turns is 5.

In FIG. 3, the conductor width increase ratio of the coil layer of specimen No. 1 was −1.017, the conductor width increase ratio of the coil layer of specimen No. 2 (comparative example) was 1, the conductor width increase ratio of the coil layer of specimen No. 3 was 1.02305, the conductor width increase ratio of the coil layer of specimen No. 4 was 1.05091, the conductor width increase ratio of the coil layer of specimen No. 5 was 1.07581, the conductor width increase ratio of the coil layer of specimen No. 6 was 1.10379, the conductor width increase ratio of the coil layer of specimen No. 7 was 1.11929, and the conductor width increase ratio of the coil layer of specimen No. 8 was 1.15.

As shown in FIG. 3, it can be seen that the coil resistance value of each turn of the coil layers of specimens No. 1 through No. 3 gradually increases from the first turn to the fifth turn. Further, it can be seen that the increase in the coil resistance value in each turn in specimens No. 1 through No. 3 increases from specimen No. 1 to specimen No. 3.

Further, it can be seen that the coil resistance value of the coil layer in specimens No. 5 through No. 8 gradually decreases from the first turn to the fifth turn. Further, the decrease in coil resistance value in each turn increases from specimens No. 5 through No. 8. Further, it can be seen that the coil resistance value of the coil layer of specimen No. 4 is substantially the same in each turn.

This is because the conductor width increase ratio increases from specimen No. 1 to specimen No. 8. Further, as shown in FIG. 3, it can be seen that the variation in coil resistance value in each turn of the coil layer in each specimen is substantially fixed. This can be considered attributable to the fact that the conductor width in each turn of the coil layer increases at a fixed ratio.

As described above, it can be seen that in FIG. 3, as compared with the case of specimen No. 2 (comparative example), in which the conductor width increase ratio is 0, that is, the conductor width of each turn is the same, the coil resistance value of each turn in specimens No. 3 through No. 8 is restrained or reduced in increasing amounts.

Figure 4:
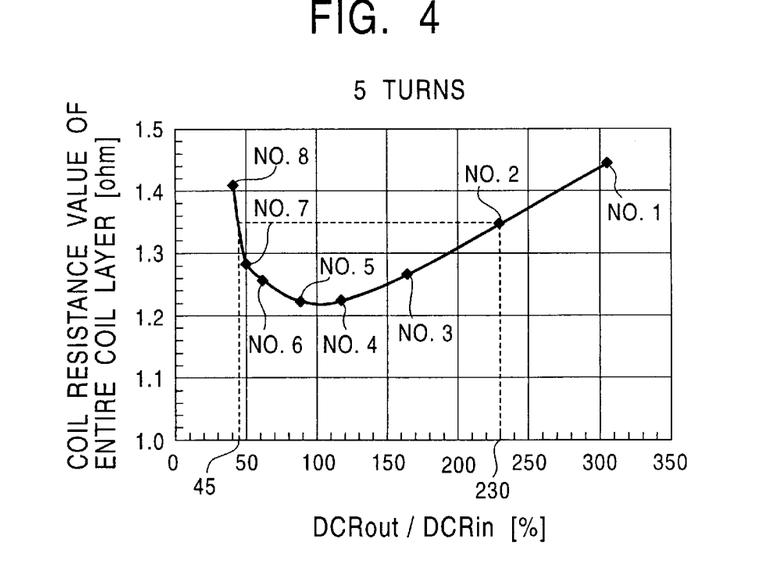
FIG. 4 is a graph showing the relationship between the DCRout/DCRin value of each specimen and the coil resistance value of the entire coil layer when the number of turns is 5.

Next, in the present invention, the relationship between DCRout/DCRin obtained by dividing the resistance value of the fifth turn in each specimen by the coil resistance value of the first turn and the coil resistance value of the entire coil layer was examined. The results are shown in FIG. 4. The DCRout/DCRin indicated by the horizontal axis shown in FIG. 4 is given in percentage.

As shown in FIG. 4, it can be seen that the coil resistance value of the entire coil layer gradually decreases from specimen No. 8 whose DCRout/DCRin is minimum, and that when the value of DCRout/DCRin is substantially 100%, the coil resistance value of the coil layer is minimum. Further, when it is over 100%, it can be seen that the coil resistance value of the entire coil layer is increased to specimen No. 1 whose DCRout/DCRin value is maximum.

In the present invention, the range of DCRout/DCRin value of approximately 45% to approximately 230% is a preferable range, in which the resistance value of the entire coil layer is reduced as compared with the case of the comparative example, in which the conductor width increase ratio is 1, that is, the conductor width of each turn is same dimension.

When the value of DCRout/DCRin is 100%, the coil resistance value of each turn is same value. In this case, as shown in FIG. 4, the resistance value of the coil layer can be reduced to the highest degree, so that, in the present invention, it is most desirable when the coil resistance value of each turn is same value.

Figure 5:
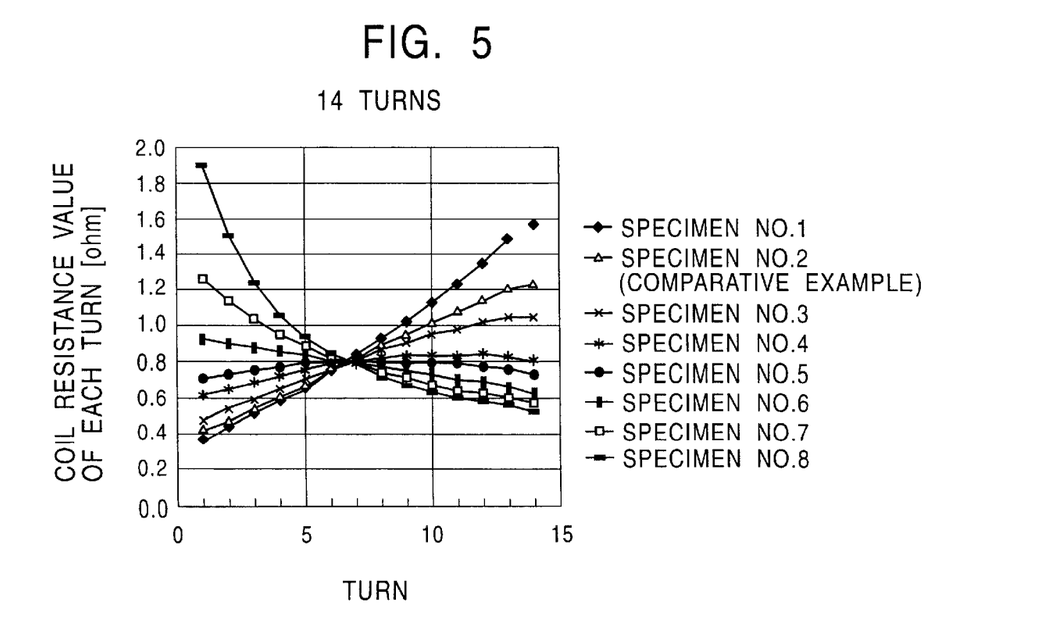
FIG. 5 is a graph of the coil resistance value of each turn of eight specimens when the number of turns is 14.

Next, in the present invention, eight coil layers were formed, with the number of turns being 14 and the conductor width increase ratio being varied, and the coil resistance value of each turn of each coil layer was measured. FIG. 5 shows the experiment results.

In FIG. 5, the conductor width increase ratio of the coil layer of specimen No. 1 was −1.002, the conductor width increase ratio of the coil layer of specimen No. 2 was 1 (comparative example), the conductor width increase ratio of the coil layer of specimen No. 3 was 1.00192, the conductor width increase ratio of the coil layer of specimen No. 4 was 1.00552, the conductor width increase ratio of the coil layer of specimen No. 5 was 1.007, the conductor width increase ratio of the coil layer of specimen No. 6 was 1.00967, the conductor width increase ratio of the coil layer of specimen No. 7 was 1.0122, and the conductor width increase ratio of the coil layer of specimen No. 8 was 1.01444.

As shown in FIG. 5, it can be seen that the coil resistance value of each turn of the coil layer in specimens No. 1 to specimen No. 4 gradually increases from the first turn to the fifth turn. And, it can be seen that the increase in coil resistance value in each turn in specimens No. 1 to No. 4 increases from specimen No. 1 to No. 4.

Further, it can be seen that the coil resistance value of the coil layer in specimen No. 6 to specimen No. 8 gradually decreases from the first turn to the fifth turn. And, it can be seen that the decrease amount in coil resistance value in each turn increases from specimen No. 6 to specimen No. 8. Further, it can be seen that the coil resistance value of the coil layer of specimen No. 5 is substantially the same in each turn.

As described above, in FIG. 5, the coil resistance value of each turn in specimen No. 3 to specimen No. 8, in which the conductor width increase ratio increases, is restrained or reduced in increase amount, as compared with the case of specimen No. 2 (comparative example), in which the conductor width increase ratio is 1 (that is, the conductor width of each turn is all the same width dimension.)

Figure 6:
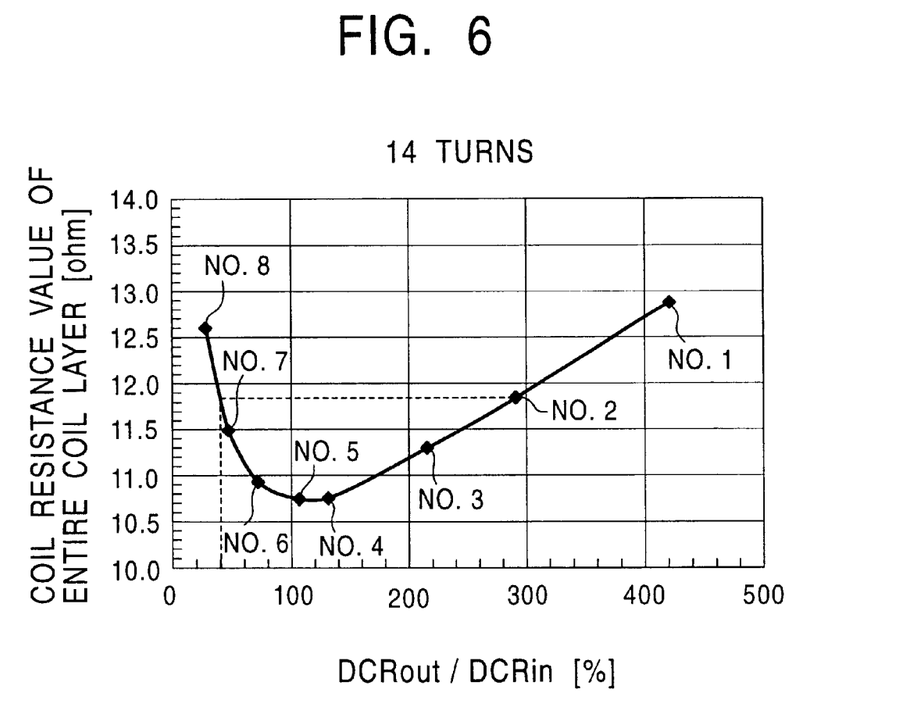
FIG. 6 is a graph showing the relationship between the DCRout/DCRin value of each specimen and the coil resistance value of the entire coil layer when the number of turns is 14.

Next, in the present invention, the relationship between the DCRout/DCRin obtained by dividing the coil resistance value of the 14th turn in each specimen by the coil resistance value of the first turn and the coil resistance value of the entire coil layer was examined. The results are shown in FIG. 6. In FIG. 6, the DCRout/DCRin indicated by the horizontal axis is given in percentage.

As shown in FIG. 6, it can be seen that as compared with the case of the comparative example, in which the conductor width increase ratio is 1, that is, the conductor width of each turn is all the same width. dimension, the DCRout/DCRin value when the resistance value of the entire coil decreases is approximately 20% to approximately 300%.

As described above, in the case in which the number of turns is 5, as compared with the case in which the conductor width increase ratio is 1 (comparative example), the DCRout/DCRin value which causes the resistance value of the entire coil layer is approximately 45% to approximately 230%. However, in the case in which the number of turns is 14, it is possible to reduce the resistance value of the entire coil layer as compared with the case in which the conductor width increase ratio is 1 (comparative example) although the range of DCRout/DCRin value is wider than this range.

That is, it is to be considered that the larger the number of turns, the wider the range of DCRout/DCRin value which can cause resistance value of the entire coil layer as compared with the case in which the conductor width increase ratio is 1 (comparative example). Thus, in the present invention, in the case in which the number of turns is 5 or more, the desirable range of DCRout/DCRin value which can cause the resistance value of the entire coil layer to be reduced as compared with the case in which the conductor width increase ratio is 1 (comparative example) is approximately 45% to approximately 230%, which is the same as that in the case of 5 turns.

The most preferable DCRout/DCRin value is approximately 100%. In this case, the coil resistance value of each turn is substantially the same value, and it is possible to most effectively reduce the coil resistance value of the entire coil layer.

As described above, in accordance with the present invention, the coil is wound such that the conductor width of the coil layer when the normal extending from the center of the coil layer to the outer periphery of the coil layer is measured increases at a fixed ratio from the inner to the outer side, whereby it is possible to restrain the increase in coil resistance value of each turn or decrease it toward the outer periphery, where the coil length is large, making it possible to reduce the coil resistance value of the entire coil layer. Further, by increasing the conductor width at a fixed ratio, it is possible to set the increase or decrease in the coil resistance value of each turn from the inner to the outer side to a substantially fixed value, so that it is possible to set the coil resistance value of the entire coil layer in a fixed ranged to effect pattern formation of the coil layer.

Further, in the present invention, the conductor width of the coil layer formed on the front side with respect to the base end portion of the upper core layer also increases from the inner to the outer side, so that it is possible to effectively reduce the coil resistance value of the coil layer on the front side with respect to the base end portion, whereby it is possible to effectively reduce the coil resistance value of the entire coil layer. At the same time, in the conductor width of the coil layer in each turn, the conductor width on the first normal extending from the center of the coil layer to the side opposed to the recording medium is smaller than the conductor width on the second normal extending from the above-mentioned center to in a direction opposite to the first normal, whereby the length between the base end portion and the forward end portion of the upper core layer is not substantially larger than that in the prior art. Thus, in the present invention, the magnetic path formed from the upper core layer to the lower core layer is not long, and it is possible to make the magnetic efficiency substantially the same as or higher than in the prior art.

Further, in the present invention, it is more desirable to set the conductor width increase ratio such that the coil resistance value in each turn from the inner to the outer side of the coil layer is substantially the same value. When the coil resistance value of each turn is substantially the same value, it is possible to most effectively reduce the coil resistance value of the entire coil layer.

What is claimed is:
1. A thin film magnetic head comprising a lower core layer formed of a magnetic material, an upper core layer formed of a magnetic material, a magnetic gap layer formed between the upper core layer and the lower core layer at a portion adjacent to a side opposed to a recording medium, and a coil layer comprising a conductor that is wound around the periphery of a base end portion of the upper core layer to form a plurality of turns, said coil layer inducing a recording magnetic field in the lower core layer and the upper core layer,     wherein a conductor width of each successive turn of the conductor of the coil layer as measured along a line extending from a center of the coil layer toward an outer periphery of the coil layer increases at a fixed ratio, and     wherein the conductor width of the conductor in each turn of the coil layer as measured along a first normal extending from the center of the coil layer to the side opposed to the recording medium is smaller than the conductor width as measured along a second normal extending from said center of the coil layer in a direction opposite to the first normal.

2. A thin film magnetic head according to claim 1, wherein the coil layer is wound so as to form at least 5 turns, and wherein the coil resistance value of an outermost turn positioned on the outer periphery of the coil layer is DCRout, and wherein the coil resistance value of an innermost turn positioned nearest to the center of the coil layer is DCRin, the percentage of DCRout/DCRin being approximately not less than 45% and not more than 230%.

3. A thin film magnetic head according to claim 2, wherein the coil resistance value is substantially the same for each turn.

4. A thin film magnetic head according to claim 3, wherein the conductor width of the conductor in each turn of the coil layer is constant for a predetermined range including the first normal.

5. A thin film magnetic head according to claim 4, wherein in a predetermined range including the second normal, the conductor width of the coil layer in each turn is the largest along the second normal and gradually decreases toward both sides.

6. A thin film magnetic head according to claim 3, wherein in a predetermined range including the second normal, the conductor width of the coil layer in each turn is the largest along the second normal and gradually decreases toward both sides.

7. A thin film magnetic head according to claim 2, wherein the conductor width of the conductor in each turn of the coil layer is constant for a predetermined range including the first normal.

8. A thin film magnetic head according to claim 7, wherein in a predetermined range including the second normal, the conductor width of the coil layer in each turn is the largest along the second normal and gradually decreases toward both sides.

9. A thin film magnetic head according to claim 2, wherein in a predetermined range including the second normal, the conductor width of the coil layer in each turn is the largest along the second normal and gradually decreases toward both sides.

10. A thin film magnetic head according to claim 1, wherein the coil resistance value is substantially the same for each turn.

11. A thin film magnetic head according to claim 10, wherein the conductor width of the conductor in each turn of the coil layer is constant for a predetermined range including the first normal.

12. A thin film magnetic head according to claim 11, wherein in a predetermined range including the second normal, the conductor width of the coil layer in each turn is the largest along the second normal and gradually decreases toward both sides.

13. A thin film magnetic head according to claim 10, wherein in a predetermined range including the second normal, the conductor width of the coil layer in each turn is the largest along the second normal and gradually decreases toward both sides.

14. A thin film magnetic head according to claim 1, wherein the conductor width of the conductor in each turn of the coil layer is constant for a predetermined range including the first normal.

15. A thin film magnetic head according to claim 14, wherein in a predetermined range including the second normal, the conductor width of the coil layer in each turn is the largest along the second normal and gradually decreases toward both sides.

16. A thin film magnetic head according to claim 1, wherein in a predetermined range including the second normal, the conductor width of the coil layer in each turn is the largest along the second normal and gradually decreases toward both sides.

* * * * *